March 15, 1938.  J. E. PADGETT  2,111,192
SHOCK ABSORBING MEANS
Filed Oct. 7, 1933  2 Sheets-Sheet 1

INVENTOR:
JOSEPH E. PADGETT.
Kwis Hudson & Kent
ATTORNEYS

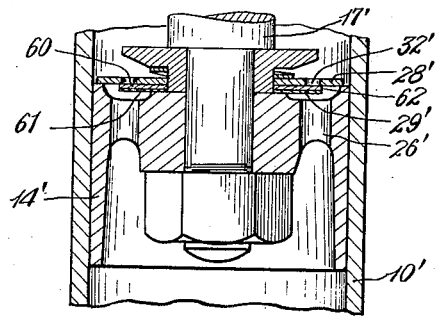

Patented Mar. 15, 1938

2,111,192

UNITED STATES PATENT OFFICE 2,111,192

SHOCK ABSORBING MEANS

Joseph E. Padgett, Toledo, Ohio, assignor, by mesne assignments, to General Motors Corporation, Detroit, Mich., a corporation of Delaware Application October 7, 1933, Serial No. 692,628

7 Claims. (Cl. 188—88)

This invention relates to shock absorbing devices and, more particularly, to an improved form of shock absorber of the fluid-flow type, and this application is a continuation in part of my copending application, Serial No. 673,587, filed May 31, 1933.

An object of the present invention is to provide an improved shock absorber embodying novel fluid-flow control means.

Another object of this invention is to provide an improved shock absorber embodying fluid-flow control means such that the pressure value of the fluid is caused to build up in the device at a rate to effectively compensate for the relatively free action of that type of vehicle spring from which various frictional factors have been eliminated.

Another object of my invention is to provide an improved fluid-flow shock absorber embodying flow control means which initially retards the displacement of fluid to cause a relatively rapid increase in the working pressure of the fluid and which provides for a subsequent flow of fluid at a rate substantially independent of changes in the viscosity of the fluid.

Another object of my invention is to provide a fluid-flow shock absorber embodying novel flow control means comprising a part having an opening therein and a thin flexible element overlapping said opening to control the same, and wherein the flexible element is such that when it is flexed away from the part by the fluid pressure acting through the opening, a relatively short passage is provided which accommodates a restricted flow of fluid at a rate substantially independent of viscosity changes.

Still another object of the invention is to provide an improved fluid type shock absorber wherein the displacement of fluid is controlled by a valve structure composed of cooperating valve elements so arranged that upon a flow of fluid in one direction one valve element is movable relative to a second valve element while such second element remains seated and, upon a flow of fluid in the reverse direction, both elements are shiftable substantially as a unit by the fluid.

My invention also contemplates the provision of an improved shock absorber of the type mentioned, wherein the flow control means includes a pair of cooperating valve plates, one of which is relatively rigid and has one or more holes therein, and the other being a relatively thin flexible disk, which is supported adjacent its center with its outer portion overlapping and closing the holes, and which is adapted to be flexed away from the rigid plate by the fluid acting through the holes.

A further object of the invention is to provide an improved shock absorber having an opening through which fluid may be forced and embodying flow control means for the opening which includes a valve element having an orifice therein and a second valve element cooperating with and movable relative to the first valve element such that the flow of fluid through the opening and the orifice is initially retarded and the subsequent flow of fluid through the opening is controlled by the orifice.

Yet another object of the invention is to provide improved flow control means for a shock absorber of the fluid type, wherein such flow control means includes a relatively rigid element having an orifice therein, and a second element cooperating with the rigid element so as to control the orifice and to initially retard the flow of fluid through the orifice.

It is also an object of this invention to provide an improved shock absorber of the fluid-flow type having a plurality of chambers and a connecting passage for forcing fluid from one chamber to the other, and wherein deflecting means is provided for progressively changing the direction of the stream of fluid flowing through said passage whereby objectionable noise and fluid disturbances are reduced to a minimum.

Other objects and advantages of this invention will be apparent from the following description when taken in conjunction with the accompanying drawings, wherein Fig. 1 is an outside elevational view of my improved shock absorber.

Fig. 5 is a partial sectional view taken as indicated by line 5—5 of Fig. 2 and showing the air eliminating means.

Fig. 7 is a partial sectional elevation illustrating another form of my improved flow control means.

Figure 2:
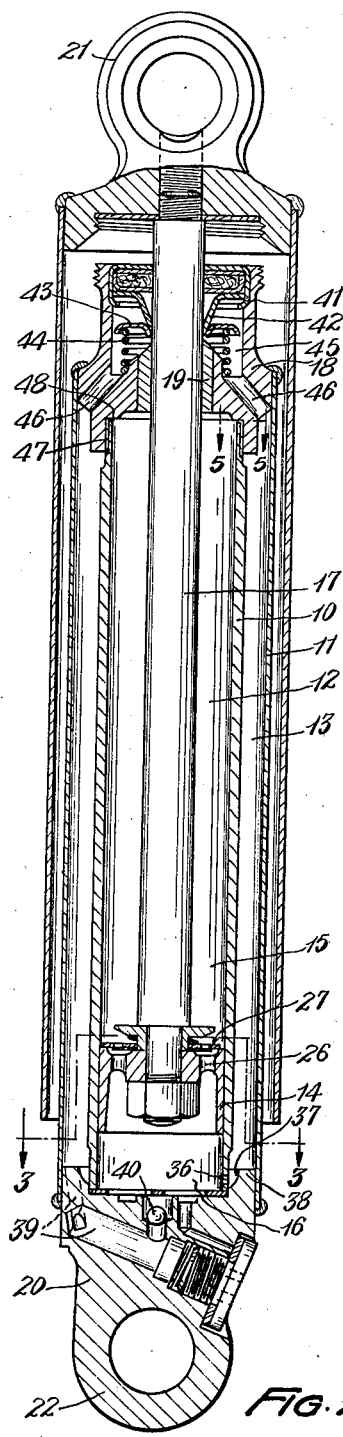
Fig. 2 is a longitudinal sectional view of this shock absorber taken as indicated by line 2—2 of Fig. 1.

Figs. 8 and 10 are partial longitudinal sectional views showing other embodiments of my novel flow control means, and Figs. 9 and 11 are transverse sectional views taken, respectively, as indicated by the corresponding section lines on Figs. 8 and 10.

In the accompanying drawings to which detailed reference will now be made, I have illustrated by improved shock absorber, which may be applied to motor vehicles or to various other uses, and which embodies novel flow control means. Although I have illustrated this novel flow control means as being embodied in a shock absorber of the direct acting type, it should be understood, however, that the invention may be embodied in various other types of shock absorbers.

My improved shock absorber, as illustrated in this instance, is provided with cylinder and reservoir barrels 10 and 11, which are disposed in coaxial relation to provide a working cylinder 12 and a reservoir chamber 13 surrounding the working cylinder. A piston 14 is reciprocable in the cylinder 12 and divides the latter into upper and lower chambers 15 and 16. An actuating shaft or rod 17 extends into the working cylinder 12 and is operatively connected to the piston 14 for reciprocating the latter in the cylinder.

Figure 1:
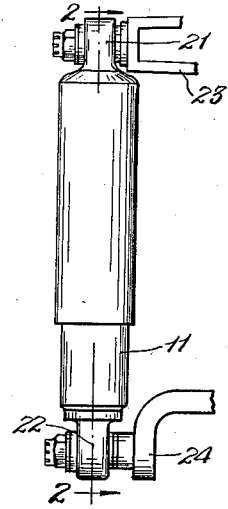
Figure 3:
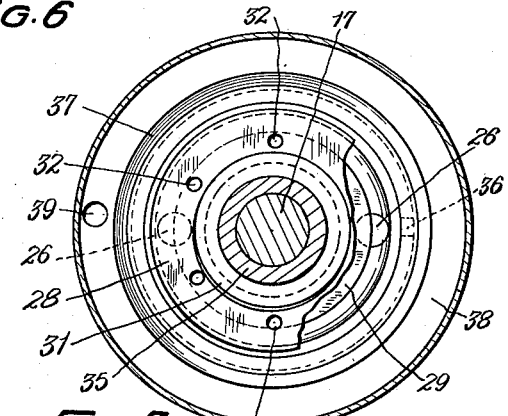
Fig. 3 is a transverse sectional view taken substantially on line 3—3 of Fig. 2.

The cylinder and reservoir barrels are closed at their upper end by means of a plug member 18 which is provided with a bearing 19 in which the shaft 17 is slidable. The cylinder and reservoir barrels are closed at their lower end by means of the plug member 20. The outer end of the shaft 17 and the plug member 20 may be provided, respectively, with connecting means, such as the eyes 21 and 22, by means of which the shock absorber may be connected to relatively movable members or vehicle parts 23 and 24, as illustrated in Fig. 1.

The piston 14 is provided with one or more relatively large openings or passages 26 for a transfer of fluid through the piston body as the latter is reciprocated in the working cylinder. For controlling such transfer of fluid through the piston, I provide novel flow controlling means in the form of the valve structure 27. This valve structure comprises a pair of plate members or disks 28 and 29 which are normally in face to face surface contact with each other and which are movably mounted on the piston in what may be termed check valve relation to the passages 26. The valve element 28 is a substantially rigid plate or disk which is normally biased into engagement with a valve seat 30 provided on the piston by means of the wavy annular spring 31. This rigid disk is provided with one or more holes 32 forming relatively short passages which, in themselves, offer very little resistance to the flow of fluid. The valve element 29 is preferably a relatively thin flexible plate or disk which overlaps and normally closes the holes 32 of the rigid valve element. This flexible valve element is disposed between the rigid valve element 28 and the body of the piston and functions as a check valve element for the holes 32, as will be presently explained.

The body of the piston 14 is preferably formed with an annular groove or recess 33 in the upper end thereof, which connects the piston passages 26 and provides an operating space for the flexible valve element 29. Inwardly of the recess 33 the piston body is provided with a surface or shoulder 34 which is engaged by the flexible valve element while the rigid valve element is against the seat 30. The piston may be provided with an extension part 35 which serves as a guide for the shiftable valve elements and as an abutment for the spring 31.

During downward movement of the piston or, in other words, during the piston stroke produced by a compressing of a vehicle spring, or other cause, some of the fluid in the lower chamber 16 is forced upwardly through the passages 26 of the piston causing the flexible plate 29 to be held in face to face contact with the rigid plate 28 and causing both plates to move upwardly together away from the piston body in opposition to the spring 31. This lifting of the valve elements by the fluid causes the rigid valve plate to separate from the annular seat 30, thereby allowing the fluid to flow upwardly between the outer edge of the rigid plate and the cylinder wall into the upper chamber 15 of the working cylinder. During the upward stroke of the piston, which, in this case may correspond with the rebound action of the vehicle spring, the rigid valve plate 28 is seated against the piston body so that fluid can be displaced downwardly through the piston only by being forced through the holes 32 of the rigid plate. The flexible plate 29 normally closes these holes, as stated above, but when the pressure acting on the flexible plate through the holes increases sufficiently, the flexible plate is sprung away from the rigid plate and a restricted displacement of fluid downwardly into the chamber 16 takes place. This restricted transfer of fluid produces an improved shock absorbing action which will be analyzed more fully hereinafter.

The chamber 16 of the working cylinder is in continuous restricted communication with the reservoir 13 through one or more restricted openings 36 provided at the lower end of the cylinder. Communication between the lower ends of the reservoir and cylinder keeps the working cylinder normally filled with fluid and, in addition, permits a transfer of fluid into or out of the working cylinder to compensate for the displacement of the shaft 17. During the downward stroke of the piston some of the fluid is displaced into the reservoir and the resistance offered to such displacement through the restricted openings 36 produces a shock absorbing action which, with the resistance to the upward flow of the fluid past the piston, produces a shock absorbing action on the compression stroke of the piston, thereby rendering the device double acting.

In some instances, the discharge of fluid into the reservoir through the restricted openings 36 has resulted in an undesirable noise being caused by the stream of fluid striking the side wall of the reservoir 11 or by an excessive disturbance being created in the fluid. To eliminate this undesirable action, I have provided for a progressive change in the direction of the stream flowing through each opening 36 whereby this stream is directed into the body of fluid in the reservoir in a direction such that it does not contact directly with the side wall of the reservoir.

I accomplish this result by providing a deflecting surface 37 adjacent the restricted openings 36 and, if desired, this deflecting surface may be arranged as shown in Fig. 2 of the drawings. In this arrangement the closure plug 20 is provided with an annular flange or projection 38, which extends between the cylinder and reservoir barrels. This projection is cut out adjacent the restricted openings 36 to provide the arcuate annular surface 37 against which the stream or streams of fluid impinge. The curvature of this surface progressively changes the direction of flow of the stream so that the latter cannot strike the side wall of the reservoir but is directed upwardly into the body of fluid. The annular flange 38 may be made relatively thick and rigid so that noise producing vibrations will not be set up in this part by the fluid striking the deflecting surface 37.

To facilitate the return of fluid into the working cylinder from the reservoir during the upward stroke of the piston, the plug member 20 may be provided with a passage 39, which bypasses the openings 36 and which is controlled by a check valve 40.

Loss of fluid, due to leakage around the shaft 17, may be prevented by providing a sealing structure 41 having a packing 42 for scraping the fluid from the shaft 17. The inner end of the packing is normally pressed against the shaft by means of the washer 43 which is biased toward the packing by a spring 44. Fluid scraped from the shaft by the packing is collected in the chamber 45 and thence drained into the reservoir through the passages 46. This fluid seal forms the subject matter of, and is claimed in, copending application Serial No. 673,586, filed May 31, 1933.

To eliminate air from the working cylinder, I proide one or more restricted passages connecting the upper end of the working cylinder with the upper end of the reservoir. These passages may be formed as shown in Figs. 2 and 5, by providing grooves 47 in the outer surface of the cylinder barrel, and by providing notches 48 in the end of the cylinder barrel in registration with the grooves. The passages provided by these grooves and notches are of such small cross-sectional area that the friction of the liquid therein prevents any substantial volume of liquid from being transferred therethrough. These passages, however, do not offer such a high resistance to a flow of air therethrough and hence do permit a transfer of air from the working cylinder into the reservoir, with the result that the tendency to create an emulsion is greatly reduced.

Figure 6:
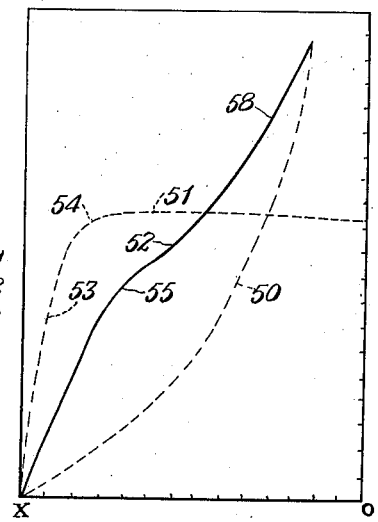
Fig. 6 is a graphic illustration of the improved action obtained by the use of my novel flow control means.

Reverting now to the valve structure described above for controlling the flow of fluid through the passages 26 of the piston, I shall explain further the novel result and beneficial action produced by this valve structure, by referring to the graphic illustration shown in Fig. 6. In this illustration the reference line $ox$ represents the velocity of piston travel in inches per second and the reference line $xy$ represents the resistance to movement, in pounds, offered by the piston. The curve 50 represents a characteristic shock absorbing action which has heretofore been obtained in shock absorbing devices, and the curve 51 is a curve representing the characteristic action of a pop-off valve. The curve 52 represents the shock absorbing action obtained from a shock absorber embodying my novel flow control means.

In accordance with present day automotive practice the springs for motor vehicles are so constructed and mounted that there is very little frictional resistance between the leaves of the spring and at the connecting shackles. This reduction, in the friction heretofore encountered in vehicle springs and their connections, has reduced the resistance heretofore offered to deflection of the springs, during both the compression and the rebound action, when the vehicle passes over rough roads. When a shock absorber having the cooperating characteristics represented by the curve 50 is applied to a vehicle wherein the spring and shackle friction has been reduced as explained above, the shock absorber does not sufficiently compensate for the friction which has been eliminated and the riding quality of the vehicle is impaired by an undesirable bouncing action, occurring at relatively low car speeds and on roads which are only moderately rough. If the shock absorber is constructed to function with the characteristics of a pop-off valve as represented by the curve 51, the initial resistance offered by the shock absorber is too great and the vehicle then rides too hard for satisfactory comfort at relatively low car speeds. In the case of the shock absorber having the action illustrated by the curve 50, the pressure of the fluid in the shock absorber increases too slowly as is shown by the slope of this curve. In the case of a shock absorber having the characteristic action represented by the curve 51, the pressure of the fluid in the shock absorber builds up too suddenly, as is shown by the slope of the portion 53 of this curve and, after having built up to the point of causing the valve to open, which is represented by the portion 54 of this curve, a further gradual increase in the pressure of the fluid, which is desirable in shock absorbers, is not usually obtained and insufficient control is provided at high car speeds or on very rough roads.

In the action of my improved flow control means, as represented by the curve 52, the fluid pressure and the spring initially acting on the rigid plate 28 press the latter against the seat 30 and also press the flexible plate 29 against the shoulder 34. This action on the flexible plate causes the same to be held against the rigid plate 28, in overlapping relation to the holes 32, initially preventing a flow of fluid downwardly through these holes with the result that the pressure of the fluid builds up rapidly in relation to the velocity of the piston. When the pressure of the fluid acting on the plate 29 through the holes increases to a value great enough to overcome the force tending to hold the flexible plate against the rigid plate, as represented by the section 55 of the curve, the portion of the flexible plate which overhangs the edge 56 of the shoulder 34 is sprung away from the rigid plate and a larger area of the flexible plate is then acted upon by the fluid. This increase, in the area of plate surface which is acted upon by the fluid, causes the flexible plate to be sprung further away from the rigid plate, and to be so held, while a restricted flow of fluid takes place downwardly through the holes 32 and through the piston passages 26.

It will be seen further from the construction and arrangement of the parts as illustrated and described, that the flexible valve plate 29 is a disk which is supported substantially centrally thereof with its outer portion overlapping and closing the holes 32 of the rigid plate 28 and with the edge 57 of such overlapping outer portion extending only a short distance, for example a few thousandths of an inch, beyond the edges of these holes. When the fluid pressure acting through the holes 32 causes the valve plate 29 to be flexed or lifted away from the rigid plate to its open position, as explained above, an annular space or passage is provided, between the rigid plate and the outer portion of the flexible plate, which connects the holes 32 with the piston groove 33. This connecting space or passage permits a regulated flow of fluid to take place downwardly through the holes 32, downwardly past or around the edge 57 of the flexible plate 29, and then downwardly through the piston passages 26.

Since the flexible plate 29 is a centrally supported disk, as pointed out above, the flexing of this plate by the fluid causes the same to tend to assume a conical shape. Because of this flexible plate being constrained to assume a conical shape when it is deflected, it is obvious that the metal of this plate offers a resistance to deflection which increases rapidly after the initial flexing of the plate. When the plate area acted upon by the fluid increases, due to the initial flexing of the plate, as explained above, the plate is rapidly sprung or snapped away from the rigid plate to an open position, thereby establishing the annular connecting space or passage just mentioned. Thus any pressure value, appreciably in excess of that pressure value which initially deflects the plate by acting thereagainst through the holes 32, will cause the plate to be quickly sprung to its open position and, because of the "stiffening up" of this plate when deflected, the open position which it assumes for pressure values greatly in excess of the opening pressure is not materially different from the open position assumed for pressure values only moderately in excess of the opening pressure. Because of the very small distance which the edge 57 of the flexible plate extends beyond the holes 32, it will be seen that the annular connecting space or passage extending downwardly past or around this edge of the flexible plate and which is provided by this plate being sprung to its open position, is substantially the equivalent of a very short, fixed, orifice opening, and the flow of fluid through this connecting passage is therefore substantially independent of viscosity changes in the fluid. During the operation of the shock absorber, this passage restricts the flow of fluid in relation to piston speed such that the pressure of the fluid will continue to build up after the opening of the valve plate 29, to thereby produce the shock absorbing action which is represented by the portion 58 of the curve 52 and which is very satisfactory for the attainment of the desired riding qualities of the vehicle.

In Fig. 7 of the drawings, I have illustrated a further improvement in the flow control means of my shock absorber, wherein the flexible valve element 29' is constructed of such material or of such form that it is responsive to temperature changes so that the functioning of this element will be automatically changed to an extent desired for the purpose of compensating for undesirable tendencies of the fluid resulting from changes in the viscosity thereof. In obtaining this result, I construct the flexible member 29' of laminations or metal sheets 60 and 61. The sheet 60 is formed of a metal having a relatively low coefficient of expansion and the sheet 61 is formed of metal having a relatively high coefficient of expansion. When the temperature of the working fluid increases, the unequal expansion of the sheets creates a tendency for the valve plate to be buckled or deflected, thereby causing the outer edge 62 of the valve plate to be pressed more firmly against the rigid plate 28'.

The increase in the temperature of the fluid also causes the viscosity of the fluid to be decreased, with the resulting tendency for a larger percentage of the fluid to leak past the outer surface of the piston 14' during the operation of the device. The increase in the force with which the flexible plate is pressed against the rigid plate, due to the flexing of the flexible plate in response to the increase in temperature, causes the flexible plate to offer greater resistance to flow through the holes 32' of the rigid plate thus creating a tendency to increase the pressure of the fluid and thereby compensating for the increase in the fluid leakage consequent to the decrease in the viscosity of the fluid. If the temperature of the fluid decreases, its viscosity increases and less leakage takes place around the piston. Such decrease in temperature also tends to cause a flexing of the flexible plate away from the rigid plate, which is opposite to the flexing described above for a temperature increase. This tendency for the flexible plate to be moved away from the rigid plate reduces the resistance which the flexible plate offers to flow through the holes 32' and thus compensates for the increase in the viscosity of the liquid.

Figure 4:
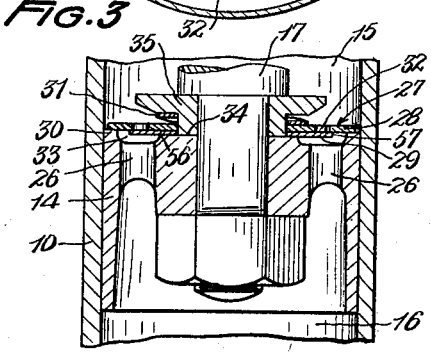
Fig. 4 is a partial sectional view, which is taken on an enlarged scale for the purpose of more clearly showing the improved flow control means.

In Figs. 8 and 10 of the drawings I have illustrated other forms of my novel flow control means which may be embodied in a shock absorber of the type illustrated in Fig. 2, or in various other types of shock absorbers, and from which I obtain substantially the same desirable operating characteristics as are obtained from the flow control means illustrated in Figs. 2 and 4 and as are represented graphically by the curve 50 in Fig. 6.

In the embodiment of the invention illustrated in Fig. 8 a piston 65 is operably connected to a piston rod 66 for reciprocation in the cylinder 67. The piston rod is provided at its inner end with a guide portion or stem 68 which extends between shoulders 69 and 70 on the rod. The piston 65 may be clamped on the piston rod against the shoulder 70 and immediately below the guide stem portion, by means of the nut 71.

The piston is provided with one or more relatively large passages 72 therethrough which are connected together by means of a channel or recess 73 formed in the upper end of the piston. For controlling the flow of fluid through the piston during movement of the latter, I provide a control valve assembly 74 comprising relatively movable cooperating valve elements 75 and 76. The valve element 75 is a substantially rigid member which is adapted to seat against the annular portion 77 of the piston. This valve element is provided with an annular chamber 78 in the under side thereof and with a plurality of orifices 79 extending through the member and communicating with this chamber. The valve element 76 has a sleeve portion 80 which is slidable on the guide stem 68 of the piston rod and has a plate portion 81 disposed between the piston and the valve element 75 and overlying the annular chamber 78 of the latter.

As shown in Fig. 8 of the drawings the sleeve portion 80 of the valve element 76 is disposed around the guide stem portion 68 of the piston rod and the valve element 75 is, in turn, disposed around the sleeve portion of the valve element 76. A wavy spring washer 82 is disposed around the sleeve portion 80 between the flange 83 at the upper end of this sleeve portion and the flange-like top portion 84 of the valve member 75. This spring normally tends to hold the plate portion 65 81 of the valve element 76 against the under side of the valve element 75.

During the downward or compression stroke of the piston 65 fluid passes upwardly through the openings 72 and, acting against the valve structure, causes both valve elements to shift upwardly substantially as a unit along the guide stem portion 68 of the piston rod. This movement causes the valve element 75 to be unseated from the annular portion 77 of the piston and fluid then passes upwardly from the recess 73 and around the outer edge of the valve element 75 into the chamber of the cylinder above the piston. The extent of movement of the valve element 75 away from the body of the piston depends upon the extent to which the spring 82 is deflected by the fluid pressure acting against the valve element after the flange portion 83 has engaged the shoulder 69 of the piston rod. On the upward or rebound stroke of the piston the valve element 75 is seated against the piston and fluid is forced downwardly through the orifices 79 into the chamber 78 where the fluid acts against the plate portion 81 of the valve element 76. The spring 82 initially prevents opening of the valve element 76, but when the pressure of the fluid increases sufficiently this valve element is moved downwardly relative to the valve element 75 causing the plate portion 81 to uncover the chamber 78, thereby allowing fluid to flow downwardly through the piston passages 72. During this downward flow the valve element 76 is held away from the valve element 75 and the orifices 79 control the flow to produce the desired shock absorbing action. These orifices are so formed that they afford the desired restriction for the shock absorbing action required and accomplish this function substantially independently of changes in the viscosity of the fluid.

In connection with the arrangement of parts in Fig. 8 and the functioning thereof as just explained above, it will be noted that with the plate portion 81 of the valve element 76 closing the bottom of the chamber 78, a relatively large area of this plate portion will be acted upon by the pressure of the fluid in the chamber. When this pressure increases to a predetermined value during the upward movement of the piston 65 it overcomes the spring 82 and causes the plate portion 81 to be moved away from the rigid valve element 75 to thereby allow fluid to be discharged from the chamber 78. If there were no additional restricting means provided the pressure of the fluid above the piston 65 would never exceed that needed to move the plate portion away from the valve element 75. However, the orifices 79 restrict the total flow of fluid after the plate portion 81 has been moved to the open position and the pressure above the piston 65 will continue to build up as the result of the restriction and thus afford additional shock absorbing resistance.

The arrangement illustrated in Fig. 10 is generally similar in principle and operation to that just described in connection with Fig. 8. In this form of the invention, as shown in the drawings, a piston 90 is reciprocable in a cylinder 91 and is connected to a piston rod or shaft 92. The piston is provided with one or more relatively large fluid passages 93 which are connected at their upper end by a recess or chamber 94 formed in the piston. An annular valve seat 95 is formed on the piston to extend around the chamber 94.

For controlling the flow of fluid through the piston during movement of the latter, I provide a valve structure comprising relatively movable valve elements 96 and 97. The valve element 96 is a substantially rigid cup-shaped member which is normally held against the valve seat 95 by the wavy spring washer 98. The valve element 96 may be mounted on a sleeve 99 which is slidable on a guide stem portion 100 of the piston rod. The valve element 96 is provided with one or more orifices 101 which extend through this element and communicate with the chamber 102 formed in the under side of this element. The valve element 97 may also be mounted on the sleeve 99 and preferably comprises a flexible metal plate which is normally biased against the valve element 96 so as to overlie and close the chamber 102 therein.

During the compression or downward stroke of the piston, fluid passes upwardly through the openings 93 of the piston and causes the valve elements 96 and 97 to be shifted substantially as a unit against the action of the spring 98, thereby causing the valve element 96 to be unseated from the portion 95 of the piston, and allowing fluid to flow upwardly through the piston and around the valve structure into the upper portion of the cylinder. During the upward or rebound stroke of the piston the valve element 96 is held against the seat 95 by the spring 98 and by fluid pressure, and fluid is forced downwardly through the orifices 101 into the chamber 102. The valve element 97 initially prevents the fluid from flowing downwardly out of the chamber 102, but when the pressure of the fluid increases sufficiently to deflect the valve element 97 away from the valve element 96 a flow of fluid takes place downwardly through the orifices 101 and through the passages 93 of the piston. The flow of fluid which takes place while the valve element 97 is held open is regulated by the orifices 101 which are so formed that the restricted flow of fluid therethrough takes place at a rate which is always substantially independent of viscosity changes in the fluid.

From the foregoing description and the accompanying drawings, it will now be readily seen that I have provided an improved shock absorber embodying novel fluid-flow control means, and wherein the flow of fluid is controlled so that the pressure of the fluid in the shock absorber builds up at the desired rate in relation to the velocity of the piston to produce the most satisfactory riding qualities when the device is applied to a vehicle. Moreover, it will be seen that I have provided novel means for preventing undesirable noises and fluid disturbances during the transfer of fluid under pressure from one chamber to another of the shock absorber.

While I have illustrated and described the apparatus of my invention in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention what I claim is:

1. In a shock absorber of the fluid displacement type the combination of a member having an orifice therein adapted to accommodate a restricted flow of fluid at a rate substantially independent of changes in the viscosity of the fluid and a chamber with which said orifice communicates, and a valve biased to normally close said chamber and orifice against a flow of fluid therethrough but adapted to be moved to open the orifice by a flow of fluid therethrough when the pressure of the fluid in the chamber reaches a predetermined value.

2. In a shock absorber of the fluid displacement type the combination of a member having a passage through which fluid may be forced, and a valve assembly controlling said passage and comprising a plurality of cooperating elements shiftable substantially as a unit away from said member upon a flow of fluid in one direction through said passage, one of said valve elements having a chamber therein and an orifice communicating with the chamber and the other element being biased to close said chamber but adapted to be opened when the fluid pressure therein reaches a predetermined value, said orifice affording resistance to flow of fluid through said passage while said other valve element is open and being such that the restricted fluid therethrough is substantially independent of viscosity changes.

3. In a shock absorber of the fluid displacement type the combination of a member having a passage through which fluid is adapted to be forced, guiding means associated with said passage, a valve element movably cooperating with said guiding means for seating engagement with said member but being adapted to be unseated by a flow of fluid in one direction through said passage, said valve element being a disk member having an opening therein, and a second valve element seating against the first mentioned valve element to control said opening, said second valve element being a metallic disk member movable with the first mentioned valve element when the latter is unseated by said flow of fluid and being adapted to be unseated from the first mentioned valve element by fluid pressure acting in the reverse direction through said opening.

4. In a shock absorber of the fluid displacement type, the combination of a member having a passage through which fluid may be forced and a valve seat around said opening, and a valve structure cooperating with said member for controlling the flow through said passage, said valve structure comprising a substantially rigid cup-shaped element with an opening therethrough and having a skirt portion adapted to engage said seat, and a flexible disk having an outer edge portion thereof engaging the skirt portion of the cup-shaped element and normally biased to engage said skirt portion to close the opening through the cup-shaped element, said flexible disk being shiftable with the cup-shaped element away from said seat by fluid pressure acting through said passage and adapted to be sprung away from the cup-shaped element by fluid acting through said opening when the cup-shaped member is in engagement with said seat.

5. In a fluid flow shock absorber, the combination of a member having a passage through which fluid may be forced and a seat around said passage, a guide on said member, and a valve structure for controlling the flow of fluid through said passage, said valve structure comprising a sleeve part cooperating with the guide, a rigid valve element disposed around said sleeve part and having an opening therethrough and adapted to engage said seat, and a relatively thin disk portion extending outwardly from said sleeve part and adapted to seat against said rigid valve element for controlling the opening therethrough, said rigid valve element and said disk portion being adapted to be shifted substantially as a unit away from the first mentioned member and said disk portion being adapted for movement away from said rigid valve element when the latter is in engagement with said seat.

6. In a fluid flow shock absorber, the combination of a member having a passage through which fluid may be forced and a seat disposed around said passage, a guide stem connected with said member, and a valve structure movable along said guide stem for controlling said passage, said structure comprising a valve element having a tubular portion guided on said stem and a disk portion extending outwardly from the tubular portion, and a rigid valve element guided on said tubular portion and adapted to engage said seat, said rigid valve element having an opening therethrough controlled by the disk portion of the first mentioned valve element.

7. In a fluid flow shock absorber, the combination of a member having a passage through which fluid may be forced and a seat disposed around said passage, a guide stem connected with said member, and a valve structure movable along said guide stem for controlling said passage, said structure comprising a valve element having a tubular portion guided on said stem and flange and disk portions at the ends of the tubular portion, a rigid valve element guided on said tubular portion between the flange and disk portions and adapted to engage said seat, and a spring between said rigid valve element and said flange portion, said rigid element having an opening therethrough controlled by the disk portion of the first mentioned valve element.

JOSEPH E. PADGETT.